(12) United States Patent
Hagstrand et al.

(10) Patent No.: US 8,443,846 B2
(45) Date of Patent: May 21, 2013

(54) POLYOLEFIN COMPOSITION FOR WATER PIPES WITH INCREASED RESISTANCE TO CHLORINE DIOXIDE

(75) Inventors: Per-Ola Hagstrand, Stenungsund (SE); Martin Anker, Hisings Karra (SE); Tanja Piel, Stenungsund (SE); Svein Jamtvedt, Stathelle (NO)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/141,668

(22) PCT Filed: Dec. 17, 2009

(86) PCT No.: PCT/EP2009/009095
§ 371 (c)(1),
(2), (4) Date: Jun. 22, 2011

(87) PCT Pub. No.: WO2010/072374
PCT Pub. Date: Jul. 1, 2010

(65) Prior Publication Data
US 2012/0000538 A1    Jan. 5, 2012

(30) Foreign Application Priority Data
Dec. 22, 2008  (EP) .................................... 08022278

(51) Int. Cl.
*F16L 9/12*  (2006.01)

(52) U.S. Cl.
USPC ............ 138/178; 524/117; 524/326; 524/340

(58) Field of Classification Search
USPC ......................... 524/117, 326, 340; 138/178
See application file for complete search history.

(56) References Cited

U.S. PATENT DOCUMENTS 6,465,548 B1   10/2002   Inoue et al.

FOREIGN PATENT DOCUMENTS

| EP | 0739937 A2 | 10/1996 |
| EP | 0810235 A2 | 12/1997 |
| EP | 1911799 A1 | 4/2008 |
| WO | 97/49758 A1 | 12/1997 |
| WO | 02/102891 A1 | 12/2002 |
| WO | 2004/055068 A1 | 7/2004 |
| WO | 2004/055069 A1 | 7/2004 |
| WO | 2008/103128 A1 | 8/2008 |

OTHER PUBLICATIONS

International Search Report for International Application No. PCT/EP2009/009095.
Written Opinion of the International Searching Authority for International Application No. PCT/EP2009/009095.

*Primary Examiner* — Peter Szekely
(74) *Attorney, Agent, or Firm* — Roberts Mlotkowski Safran & Cole, P.C.

(57) ABSTRACT

The present invention relates to a polyolefin composition with increased resistance to degradation caused by $ClO_2$-containing water and to a pipe made of such a polyolefin composition. The present invention further relates to the use of the polyolefin composition for the production of a pipe and to the use of a combination of particular types of antioxidants for increasing the resistance of the polyolefin composition against degradation caused by contact with $ClO_2$-containing water.

7 Claims, No Drawings

POLYOLEFIN COMPOSITION FOR WATER PIPES WITH INCREASED RESISTANCE TO CHLORINE DIOXIDE

The present invention relates to a polyolefin composition with increased resistance to degradation caused by chlorine dioxide-containing water and to a pipe made of such a polyolefin composition. The present invention further relates to the use of the polyolefin composition for the production of a pipe and to the use of a combination of particular types of antioxidants for increasing the resistance of the polyolefin composition against degradation caused by contact with chlorine dioxide-containing water.

Recent progresses in the manufacturing and processing of polymers have led to the application of plastics in virtually every aspect of modern day life. However, polymeric compounds are prone to aging under the effects of oxidants, light and heat. This results in a loss of lifetime such as loss of strength, stiffness and flexibility, discoloration and scratching as well as loss of gloss.

It is well-known in the art that antioxidants and light stabilizers can prevent or at least reduce these effects. Several types of additives are added to polymers to protect them during processing and to achieve the desired end-use properties. Additives are generally divided in stabilizers and modifiers. Stabilizers, like antioxidants, traditionally and currently used comprise sterically hindered phenolics, aromatic amines, hindered amine stabilizers, organo-phosphites/phosphonites and thioethers. However, appropriate combinations of stabilizers have to be carefully selected, depending on the desired final properties, the polymeric article should have.

Besides many other applications, polyolefins are used for the preparation of pipes for drinking water distribution systems. It is known that chlorine in different molecular forms is used as disinfectant in water treatment to prevent spread of infectious diseases. It is also known that most materials, including many polymers such as polyolefins, age in chlorinated water. Results from pressure testing in laboratories and experience from the field have shown that high concentration of chlorine in water can cause early brittle fracture in polyolefin pipes.

A further disinfectant used in water is chlorine dioxide, $ClO_2$. Hence, chlorine dioxide-containing water is in permanent contact with the pipe material. Due to the permanent contact to the inner pipe surface, deterioration of the polyolefin composition is caused.

It has been found that antioxidants used in polyolefin compositions for pipes known to provide a good resistance to chlorinated water do not necessarily provide satisfactory resistance against chlorine dioxide-containing water. Thus, there is still a need for a more efficient antioxidant which provides a better protection against $ClO_2$-containing water to a polyolefin composition, and thus allows for a longer lifetime of e.g. a pipe, made of a polyolefin composition containing such an antioxidant.

A further important issue as regards the presence of antioxidants in polyolefin compositions is the aim to avoid contamination of media transported e.g. in a pipe made of such a polyolefin composition. This is particularly important in case of a pipe transporting drinking water. Generally speaking, it is preferred to use as low concentrations of antioxidant as possible in order to lower the amount of antioxidant which may possibly be extracted by the water transported in the pipe. Further in this context, it is desirable that the antioxidant used has a low tendency to extraction by the water transported in the pipe.

These issues are addressed in EP 1 911 799 wherein classes of antioxidants for polyolefin compositions for pipes are provided which improve the resistance against chlorine dioxide-containing water. However, the reported resistance is still lower than the resistance against chlorinated water.

Hence, there is still a need for improved polyolefin compositions suitable for water pipe applications, particularly for polyolefin compositions having an increased lifetime in contact to chlorine dioxide-containing water.

Thus, it is an object of the present invention to provide a polyolefin composition for pipes having an increased lifetime in permanent contact with chlorine dioxide-containing water.

The present invention is based on the finding that the object of the invention can be achieved, if the polyolefin composition comprises a specific combination of several types of antioxidants.

Therefore, the present invention relates to a polyolefin composition comprising
a) a polyolefin base resin (A),
b) an antioxidant (B) according to formula (I):

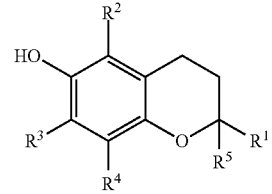

wherein $R^1$, $R^2$, $R^3$, $R^4$ and $R^5$ independently are H, or non-substituted or substituted aliphatic or aromatic hydrocarbyl radicals which may comprise heteroatoms,
c) an antioxidant (C) according to formula (II):

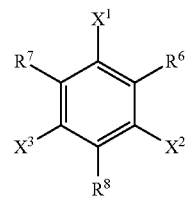

wherein
$R^6$, $R^7$ and $R^8$ independently are non-substituted or substituted aliphatic or aromatic hydrocarbyl radicals which may comprise OH-groups,
$X^1$, $X^2$, and $X^3$ independently are H or OH, with the provisio that at least one of $X^1$, $X^2$ and $X^3$ is OH,
the entire molecule does not comprise an ester group, and
d) an antioxidant (D) according to formula (III):

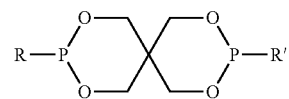

wherein R and R' is the same or different, and R and R' independently comprise at least 6 carbon atoms and may comprise heteroatoms.

The heteroatoms which may be present in the non-substituted or substituted aliphatic or aromatic hydrocarbyl radicals $R^1$, $R^2$, $R^3$, $R^4$ and/or $R^5$ of antioxidant (B) according to formula (I) may be oxygen, sulphur, nitrogen, phosphorus or the like. It is, however, preferred that $R^1$, $R^2$, $R^3$, $R^4$ or $R^5$, more preferred $R^1$, $R^2$, $R^3$, $R^4$ and $R^5$, do not comprise heteroatoms, i.e. are non-substituted or substituted aliphatic or aromatic hydrocarbyl radicals only, or, as mentioned, H.

Furthermore, preferably $R^2$, $R^3$, $R^4$ or $R^5$, more preferably $R^2$, $R^3$, $R^4$ and $R^5$, are H, or saturated aliphatic hydrocarbyl radicals comprising from 1 to 5 carbon atoms, and still more preferably $R^2$, $R^3$, $R^4$ or $R^5$, more preferably $R^2$, $R^3$, $R^4$ and $R^5$, are H, or methyl groups.

Furthermore, preferably $R^5$ is a methyl group, regardless of the nature of the other residues $R^2$ to $R^4$.

In an especially preferred embodiment, $R^4$ and $R^5$ are methyl groups, and $R^2$ and $R^3$ are H, or methyl groups.

Most preferably, $R^2$, $R^3$, $R^4$ and $R^5$ are all methyl groups.

Still further, preferably $R^1$ is a non-substituted or substituted aliphatic or aromatic hydrocarbyl radical containing from 5 to 50 carbon atoms, more preferably $R^1$ is a non-substituted or substituted aliphatic hydrocarbyl radical containing from 5 to 50, more preferably from 10 to 30, carbon atoms, and most preferably $R^1$ is a 4,8,12-trimethyl-tridecyl group.

Still more preferred, antioxidant (B) is 2,5,7,8-Tetramethyl-2-(4',8',12'-trimethyltridecyl)chroman-6-ol (Vitamine E).

In antioxidant (C) according to formula (II) residues $R^6$, $R^7$ and $R^8$ independently are non-substituted or substituted aliphatic or aromatic hydrocarbyl radicals which may comprise OH-groups. This means that apart from OH-groups no further heteroatoms are present in $R^6$, $R^7$ and $R^8$, so that phenolic stabilizer (C) is e.g. free of ester groups, amide groups and groups containing phosphorus.

Preferably, $R^6$, $R^7$ and $R^8$ which independently are non-substituted or substituted aliphatic or aromatic, more preferably aliphatic, hydrocarbyl radicals which may comprise OH-groups, have from 2 to 200 carbon atoms.

Preferably, $R^6$ and $R^7$ independently have from 2 to 20 carbon atoms, more preferably from 3 to 10 carbon atoms.

Furthermore, it is preferred that $R^6$ and/or $R^7$, more preferably $R^6$ and $R^7$, are aliphatic hydrocarbyl groups with at least 3 carbon atoms which have a branch at the second carbon atom, and most preferably $R^6$ and/or $R^7$, more preferably $R^6$ and $R^7$, are tert. butyl groups.

Preferably, $R^8$ has from 20 to 100 carbon atoms, more preferably has from 30 to 70 carbon atoms.

Furthermore, it is preferred that $R^8$ includes one or more phenyl residues.

Still further, it is preferred that $R^8$ includes one or more hydroxyphenyl residues.

In the most preferred embodiment, $R^8$ is a 2,4,6-tri-methyl-3,5-di-(3,5,-di-tert. butyl-4-hydroxyphenyl)benzene residue.

Preferably, in antioxidant (C) of formula (II) $X^1$ is OH, and most preferably $X^1$ is OH and $X^2$ and $X^3$ are H.

It is particularly preferred that antioxidant (C) is 1,3,5-Trimethyl-2,4,6-tris-(3,5-di-tert. butyl-4-hydroxyphenyl)benzene (Irganox 1330).

It is preferred that in formula (III) of compound (D) R and R' each is the same or different residue and comprise preferably at least 10 C-atoms.

Preferably, R and R' do not comprise more than 100 carbon atoms each.

Preferably, in formula (III) R and/or R' is R"-O—, the oxygen atom being connected to the phosphorus atom of formula (III). Preferably, R" comprises at least 6 carbon atoms, more preferably at least 10 carbon atoms. Preferably, R" does not comprise more than 100 carbon atoms each.

Preferably, R, R' and/or R" comprise at least one aryl group.

In a particular preferred embodiment of the present invention compound (D) is Bis(2,4-dicumylphenyl)pentaerythritol-di-phosphite (Doverphos S-9228 CT).

Antioxidant (B) is preferably contained in the composition in an amount of 5000 ppm or less, more preferably 2000 ppm or less, still more preferably 1000 ppm or less, still more preferably 500 ppm or less, and most preferably 300 ppm or less, based on the total composition.

The amount of antioxidant (C) in the polyolefin composition is preferably 5000 ppm or less, more preferably 3500 ppm or less, still more preferably 2500 ppm or less and particularly preferred is 1300 ppm or less, based on the total composition.

Furthermore, antioxidant (D) is preferably used in an amount of 5000 ppm or less, more preferably of 2000 ppm or less, most preferably of 1000 ppm or less, based on the total composition.

Usually, the composition will contain any of the antioxidants (B), (C) and (D) independently in an amount of at least 50 ppm.

Preferably, the sum of concentration of antioxidants (B), (C) and (D) is between 500 and 2500 ppm, more preferably between 1000 and 2000 ppm, still more preferably between 1100 and 1800 ppm.

The term "base resin" denotes the entirety of polymeric components in the polyolefin composition according to the invention, usually making up at least 90 wt % of the total composition.

The favourable effect of the antioxidants according to the present invention is not dependent on the type of polyolefin base resin used. The base resin may therefore be any polyolefin or polyolefin composition.

Still further, it is preferred that the base resin (A) comprises a polyethylene homo- or copolymer, more preferably that the base resin (A) consists of a polyethylene homo- or copolymer.

In one embodiment of the invention the base resin comprises two or more polyolefin, more preferably polyethylene, fractions with different weight average molecular weight. Such resins usually are denoted as multimodal resins.

Polyolefin, in particular polyethylene, compositions comprising multimodal resins are frequently used e.g. for the production of pipes due to their favourable physical and chemical properties as e.g. mechanical strength, corrosion resistance and long-term stability. Such compositions are described e.g. in EP 0 739 937 and WO 02/102891. The term molecular weight used herein generally denotes the weight average molecular weight $M_w$.

As mentioned, usually a polyethylene composition comprising at least two polyolefin fractions, which have been produced under different polymerisation conditions resulting in different weight average molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In the preferred embodiment wherein the base resin consists of two polyethylene fractions, the fraction having a lower weight average molecular weight is denoted fraction (A), the other is denoted fraction (B).

Fraction (A) preferably is an ethylene homopolymer.

Fraction (B) of the polyethylene composition preferably is an ethylene copolymer, and preferably comprises at least 0.1 mol % of at least one alpha-olefin comonomer. The amount of comonomer is preferably at most 14 mol %.

In the preferred embodiment wherein the polyolefin composition is a polyethylene composition, the base resin of the polyethylene composition preferably comprises at least 0.1 mol %, more preferably at least 0.3 mol %, and still more preferably at least 0.7 mol % of at least one alpha-olefin comonomer. The amount of comonomer is preferably at most 7.0 mol %, more preferably at most 6.0 mol %, and still more preferably at most 5.0 mol %.

As an alpha-olefin comonomer, preferably an alpha-olefin having from 4 to 8 carbon atoms is used. Still more preferably an alpha-olefin selected from 1-butene, 1-hexene, 4-methyl-1-pentene and 1-octene is used.

The polyolefin base resin preferably has an $MFR_5$ (190° C., 5 kg) of from 0.01 to 5.0 g/10 min, more preferably from 0.1 to 2.0 g/10 min, and most preferably from 0.20 to 0.5 g/10 min.

The density of the base resin preferably is from 930 to 960 kg/m$^3$, more preferably is from 935 to 958 kg/m$^3$, and most preferably is from 938 to 952 kg/m$^3$.

In addition to the base resin and the antioxidants, usual additives for utilization with polyolefins, such as pigments (for example carbon black), stabilizers, antiacids and/or anti-UVs, antistatic agents and utilization agents (such as processing aid agents) may be present in the polyolefin composition. The amount of such additives usually is 10 wt % or below.

The polymerisation catalysts for the production of the base resin include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention, reference is made to WO 2004/055068 and WO 2004/055069 of Borealis and EP 0 810 235. The content of these documents in its entirety is incorporated herein by reference, in particular concerning the general and all preferred embodiments of the catalysts described therein as well as the methods for the production of the catalysts. Particularly preferred Ziegler-Natta catalysts are described in EP 0 810 235.

The composition preferably is produced in a process comprising a compounding step, wherein the base resin which is typically obtained as a base resin powder from the reactor, together with the antioxidants and optionally other additives is extruded in an extruder to yield the composition according to the present invention.

Of course, when using the inventive composition, further compounds selected from conventional additives, fillers, minerals and lubricants may be added for improving processability and surface characteristics thereof.

The composition of the present invention is preferably used in pipes—black as well as natural (i.e. non-colored) or colored pipes. Preferably, such a pipe is used in a drinking water supply system. It is furthermore preferred that the pipe is a cold water pipe, i.e. that it is designed for the transport of cold water.

Hence, the present invention is also directed to a pipe comprising the inventive polyolefin compositions mentioned above including all the preferred embodiments. Such pipes show an improved resistance against chlorine dioxide-containing water.

The pipes are preferably produced by extrusion of the polyolefin compositions.

The present invention is therefore also directed to the use of a polyolefin composition according to the invention, including all of the preferred embodiments, for the production of a pipe.

The present invention is also directed to the use of said inventive pipes for the transport of chlorine dioxide-containing water.

Finally, the present invention is further directed to the use of a combination of antioxidants (B), (C) and (D) as defined above, including all of the preferred embodiments, for increasing the resistance of a polyolefin composition against degradation caused by contact with chlorine dioxide-containing water.

EXAMPLES

1. Definitions and Measurement Methods a) Density

Density is measured according to ISO 1183. Sample preparation is done in accordance with ISO 1872/2B.

b) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. for polyethylene and may be determined at different loadings such as 2.16 kg ($MFR_2$), 5.00 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/5}$ denotes the value of $MFR_{21}/MFR_5$.

c) Measurement of Lifetime of Pipes in Contact with $ClO_2$

No standard exists yet for evaluating the resistance of pipes comprising a polyethylene composition to $ClO_2$-containing water. However, there is a standard for measuring the resistance to chlorinated water: ASTM F2263-03, "Standard test method for evaluating the oxidative resistance of Polyethylene (PE) pipe to chlorinated water". The lifetime of the pipes is tested accordingly with equipment according to ASTM F2263-03. However, $ClO_2$ is applied instead of chlorine.

A circulation loop is used for water which contains $ClO_2$. The concentration of $ClO_2$ in the water is 1.0±0.1 ppm. The pH of the water is 6.8±0.2. The temperature of the water is 90±1° C. The hoop stress applied to the pipe is about 1.7 MPa. The oxidation reduction potential (ORP) is 740 mV and is measured frequently. The flow volume is 23 l/h at a flow velocity of about 0.13 m/s and a fluid pressure of 6.5 bar. The free pipe length is 250 mm, the outer diameter of the pipe is 12 mm and the thickness of the wall is 2 mm. In the tests two pipes of each material are tested in series. Each pipe is tested until failure. The average of the two lifetime values is calculated.

The circulation loop used for $ClO_2$ testing is made from inert materials (e.g. titanium, PVDF (Polyvinylidene difluoride), PTFE (Polytetrafluoro-ethylene) to avoid contamination of the test fluid. The fittings are of PVDF. The test fluid is continuously purified in three steps to avoid any contamination: 1. active carbon filter, 2. particle filter, 3. reverse osmosis. The internal environment is the above-mentioned solution of $ClO_2$ in water, the external environment is air.

The $ClO_2$ is generated directly at the site using a commercial $ClO_2$-generator from Prominent following the equation:

$$5NaClO_2 + 4HCl \rightarrow 4ClO_2 + 2H_2O + 5NaCl$$

The mechanism for feeding the stock solutions ($NaClO_2$ and HCl) to the process is monitored to maintain a consistent ratio of chemicals.

All tests were carried out at Bodycote Polymer AB, Nyköping, Sweden.

d) Content of Antioxidant

Sample preparation: The polymer pellets are ground in an ultracentrifugal mill (Retsch ZM 100) with a sieve with 2 mm holes. The pellets are cooled down with liquid nitrogen. 5 g of the ground polymer is extracted in 50 ml of cyclohexane at a temperature of 81° C. for 2 hours. If needed, cyclohexane is then added to exact 50 ml again. The solution is cooled down in room temperature and thereafter the polymer is precipitated with 50 ml iso-propanol. A suitable amount of the solution is filtered and injected into HPLC equipment.

The HPLC measurement can e.g. be performed with a reversed phase C-18 column and methanol and water as mobile phase, for example in a ratio of 85:15. A UV detector can be used, wavelength 280 nm for Irganox 1010, Irgafos 168, Irganox 1330 and Vitamin E and 220 nm for Doverphos S-9228. The quantification is made using calibration curves in a conventional manner.

2. Lifetime of Pipes Comprising Different Antioxidants

Polyethylene compositions for the testing of pipes were produced from commercially available polyethylene resins. The properties of the base resins used, as well as the additives which were added to the base resins to yield the polyethylene compositions used for pipe production are given in Table 1. If not indicated otherwise, the values are given in wt %. Still further, in Table 1 also the results of the lifetime tests in $ClO_2$-containing water are given.

The compositions for the examples were compounded/melt homogenized in a Buss-Co-Kneader 100 MDK/E-11 L/D. Polymer and additives were fed into the first mixer inlet of the Buss Co-Kneader which is a single screw extruder with a downstream discharge single extruder with pelletizing unit cutting pellets in molten stage and cooled via water. The mixer temperature profile was 91/164/193/189/196° C. from first inlet to outlet, and discharge extruder temperature 113° C. The mixer screw rpm was 195 rpm and the throughput 175 kg/h.

Pipes 12×2 mm (outer diameter×wall thickness) were prepared by extrusion in a Battenfeld 45-25B extruder, which gave an output of 15 kg/h at a screw speed of 16 rpm. The extruder melt temperature was 218° C.

In the Example according to the invention (Example 1) a mixture of three antioxidants is used, namely 1,3,5-Trimethyl-2,4,6-tris-(3,5-di-tert. butyl-4-hydroxy-phenyl)benzene (CAS No. 1709-70-2, Irganox 1330 from Ciba Speciality Chemicals), 2,5,7,8-Tetramethyl-2-(4',8',12'-trimethyl-tridecyl)chroman-6-ol (CAS No. 10191-41-0, Irganox E 201, Vitamin E from Ciba Speciality Chemicals) and Bis(2,4-dicumylphenyl)penta-erythritol-di-phosphite (CAS No. 154862-43-8, Doverphos S-9228 CT from Dover Chemical). In (Comparative) Example 2 a typical mixture of conventional antioxidants is used, namely Tris(2,4-di-tert. butylphenyl)phosphite (CAS No. 31570-04-4, Irgafos 168 from Ciba Speciality Chemicals) and Pentaerythrityl-tetrakis(3-(3',5'-di-tert. butyl-4-hydroxyphenyl)propionate (CAS No. 6683-19-8, Irganox 1010, from Ciba Speciality Chemicals). In (Comparative) Examples 3 and 4 Irganox 1330 is either used in combination with Doverphos S-9228 CT or in combination with Vitamin E. It can be seen that only the inventive combination of three antioxidants from different classes achieves the highly improved resistance against $ClOC_2$-containing water.

TABLE 1

|  | Example 1 | Example 2 | Example 3 | Example 4 |
|---|---|---|---|---|
| base polymer | 93.99 | 93.96 | 94.00 | 93.96 |
| Density /kg/m$^3$ | 949 | 949 | 949 | 949 |
| MFR$_5$/g/10 min | 0.25 | 0.25 | 0.25 | 0.25 |
| Comonomer | 1-butene | 1-butene | 1-butene | 1-butene |
| Comono. content/wt % | 1.05 | 1.05 | 1.05 | 1.05 |
| Calcium stearate | 0.15 | 0.15 | 0.15 | 0.15 |
| Carbon black MB | 5.75 | 5.75 | 5.75 | 5.75 |
| Irgafos 168/ppm |  | 710 |  |  |
| Doverphos S-9228/ppm | 221 |  |  | 552 |
| Irganox 1010/ppm |  | 684 |  |  |
| Vitamin E/ppm | 74 |  | 166 |  |
| Irganox 1330/ppm | 817 |  | 792 | 838 |
| Antioxidants, total/ppm | 1112 | 1394 | 958 | 1390 |
| ClO$_2$-resistance 1/h | 2245 | 1852 | 1379 | 1401 |
| ClO$_2$-resistance 2/h | 2289 | 1220 | 1418 | 1470 |
| average value/h | 2267 | 1536 | 1399 | 1436 |

The invention claimed is:

1. A pipe comprising a polyolefin composition, comprising a) a polyolefin base resin (A), b) an antioxidant (B) according to formula (I):

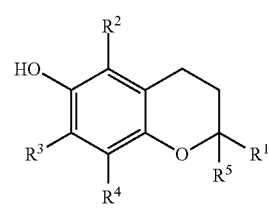

wherein $R^1$, $R^2$, $R^3$, $R^4$ and $R^5$ independently are H, or non-substituted or substituted aliphatic or aromatic hydrocarbyl radicals which may comprise heteroatoms, c) an antioxidant (C) according to formula (II):

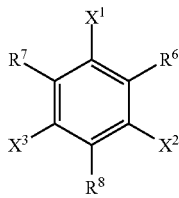

wherein
R$^6$, R$^7$ and R$^8$ independently are non-substituted or substituted aliphatic or aromatic hydrocarbyl radicals which may comprise OH-groups,
X$^1$, X$^2$, and X$^3$ independently are H or OH, with the provisio that at least one of X$^1$, X$^2$ and X$^3$ is OH,
the entire molecule does not comprise an ester group, and
d) an antioxidant (D) according to formula (III):

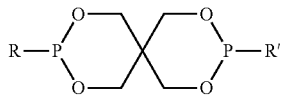

wherein R and R' is the same or different, and R and R' independently comprise at least 6 carbon atoms and may comprise heteroatoms.

2. The pipe according to claim 1, wherein the base resin (A) comprises a polyethylene homo- or copolymer.

3. The pipe according to claim 1, wherein the sum of concentration of antioxidants (B), (C) and (D) is between 1100 and 1800 ppm.

4. A method for the transport of chlorine dioxide-containing water using a pipe comprising a polyolefin composition, comprising
a) a polyolefin base resin (A),
b) an antioxidant (B) according to formula (I):

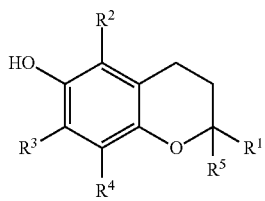

wherein R$^1$, R$^2$, R$^3$, R$^4$ and R$^5$ independently are H, or non-substituted or substituted aliphatic or aromatic hydrocarbyl radicals which may comprise heteroatoms,
c) an antioxidant (C) according to formula (II):

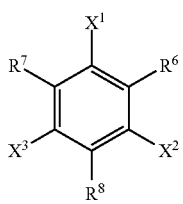

wherein
R$^6$, R$^7$ and R$^8$ independently are non-substituted or substituted aliphatic or aromatic hydrocarbyl radicals which may comprise OH-groups,
X$^1$, X$^2$, and X$^3$ independently are H or OH, with the provisio that at least one of X$^1$, X$^2$ and X$^3$ is OH,
the entire molecule does not comprise an ester group, and
d) an antioxidant (D) according to formula (III):

wherein R and R' is the same or different, and R and R' independently comprise at least 6 carbon atoms and may comprise heteroatoms.

5. Method for increasing the resistance of a polyolefin composition against degradation caused by contact with chlorine dioxide-containing water, using a combination of three antioxidants (B), (C) and (D) wherein said antioxidants have the following formulae:
antioxidant (B) according to formula (I):

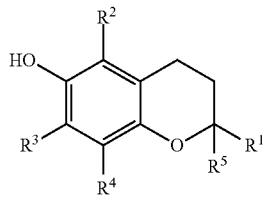

wherein R$^1$, R$^2$, R$^3$, R$^4$ and R$^5$ independently are H, or non-substituted or substituted aliphatic or aromatic hydrocarbyl radicals which may comprise heteroatoms,
antioxidant (C) according to formula (II):

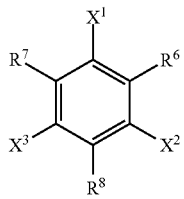

wherein
R$^6$, R$^7$ and R$^8$ independently are non-substituted or substituted aliphatic or aromatic hydrocarbyl radicals which may comprise OH-groups,
X$^1$, X$^2$, and X$^3$ independently are H or OH, with the provisio that at least one of X$^1$, X$^2$ and X$^3$ is OH,
the entire molecule does not comprise an ester group, and
antioxidant (D) according to formula (III):

wherein R and R' is the same or different, and R and R' independently comprise at least 6 carbon atoms and may comprise heteroatoms.

6. The method according to claim 4, wherein the base resin (A) comprises a polyethylene homo- or copolymer.

7. The method according to claim 4, wherein the sum of concentration of antioxidants (B), (C) and (D) is between 1100 and 1800 ppm.

* * * * *